United States Patent
Lee (10) Patent No.: US 9,726,850 B2
(45) Date of Patent: Aug. 8, 2017

(54) MOTOR FOR ACTUATING LENS OF A CAMERA MODULE

(71) Applicant: LG INNOTEK CO., LTD., Seoul (KR)

(72) Inventor: Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 38 days.

(21) Appl. No.: 14/560,448

(22) Filed: Dec. 4, 2014

(65) Prior Publication Data
US 2015/0153540 A1  Jun. 4, 2015

(30) Foreign Application Priority Data

Dec. 4, 2013  (KR) .................. 10-2013-0149982

(51) Int. Cl.
G02B 7/04 (2006.01)
H02K 41/035 (2006.01)

(52) U.S. Cl.
CPC ........... *G02B 7/04* (2013.01); *H02K 41/0356* (2013.01)

(58) Field of Classification Search
CPC .............................. G02B 7/04; H02K 41/0356
USPC ......................................... 348/357
See application file for complete search history.

(56) References Cited

U.S. PATENT DOCUMENTS

2004/0223423 A1*  11/2004  Tsuda ............... H04R 9/027
                                                    369/44.16
2012/0008221 A1*  1/2012  Min ................ H02K 41/0356
                                                    359/824

FOREIGN PATENT DOCUMENTS

KR   10-2010-0029297   *   3/2010   ............. H04N 5/232

* cited by examiner

*Primary Examiner* — Nhan T Tran
*Assistant Examiner* — Chan Nguyen
(74) *Attorney, Agent, or Firm* — KED & Associates, LLP

(57) ABSTRACT

A lens actuating motor is provided. The motor includes a lens unit and an actuator unit including a bobbin configured to fix the lens unit, a coil unit configured to wind an outer side surface of the bobbin, a magnet unit disposed to face the coil unit, a yoke unit configured to fix the magnet unit, and a printed circuit board configured to apply an electrical power source, wherein the bobbin includes a body configured to hold the lens unit, at least two straight line parts formed on an outer side surface of the body, a curved part formed between the straight line parts, and a damping member coated on a side of the magnet unit facing the bobbin.

21 Claims, 7 Drawing Sheets

MOTOR FOR ACTUATING LENS OF A CAMERA MODULE

CROSS-REFERENCE TO RELATED APPLICATION(S)

This application claims priority under 35 U.S.C. §119 to Korean Patent Application Number 10-2013-0149982, filed on Dec. 4, 2013, whose entire disclosure is incorporated by reference herein.

BACKGROUND

1. Field

The present disclosure relates to a structurally advanced motor for actuating lens.

2. Background

Concomitant with wide propagation of various mobile terminals and commercialization of wireless Internet services, demands by consumers related to the mobile terminals are diversified, and various types of additional equipment are attached to the mobile terminals.

Among the various types of additional equipment, a lens actuating motor may be a representative device capable of editing and transmitting a still image or a moving picture, as necessary, by photographing the still image or the moving picture, and storing the still image or the moving picture in image data.

In recent years, there has been a growing demand for small-sized lens actuating motors in a wide variety of multimedia field such as notebook personal computers, camera-equipped mobile phones, PDAs, or smart toys, and even for surveillance cameras or image input devices such as information terminals of video tape recorders.

The conventional lens actuating motor includes a lens unit and an actuator unit. The actuator unit includes a bobbin configured to fix the lens unit, a coil unit configured to wind an outer side surface of the bobbin, a magnet unit disposed to face the coil unit, and a yoke unit configured to fix the magnet unit.

However, during the manufacturing process, when the coil unit is winding the bobbin, a distortion of shape may occur, causing a decline of reliability on precise image focus.

In addition, a swift focus adjustment may not be performed in the conventional lens actuating motor, because it takes longer setting time which is required to return to the initial stage after movement of the bobbin.

BRIEF DESCRIPTION OF THE DRAWINGS

The embodiments will be described in detail with reference to the following drawings in which like reference numerals refer to like elements wherein.

DETAILED DESCRIPTION

Hereinafter, referring to enclosed figures, an exemplary embodiment of the present disclosure will be described in detail.

Unless defined otherwise herein, all technical and scientific terms used herein have the same meaning as commonly understood by one of ordinary skill in the art to which this invention belongs. In a case when a term used herein conflicts with the customary meaning of the corresponding term, the meaning of the term defined herein shall supersede the customary meaning.

However, the terms mentioned herein are used merely for description of a particular exemplary embodiment. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

Hereinafter, referring to accompanying drawings, an embodiment according to the present invention will be described in detail.

Figure 1:
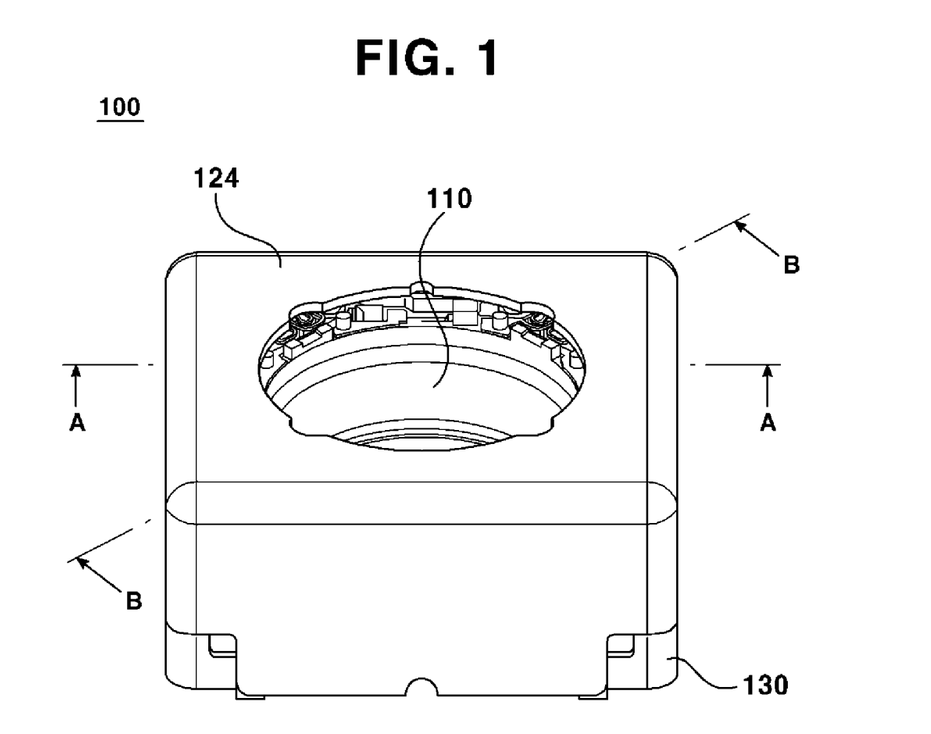
FIG. 1 is a perspective view illustrating a lens actuating motor according to an exemplary embodiment of the present disclosure.
Figure 2:
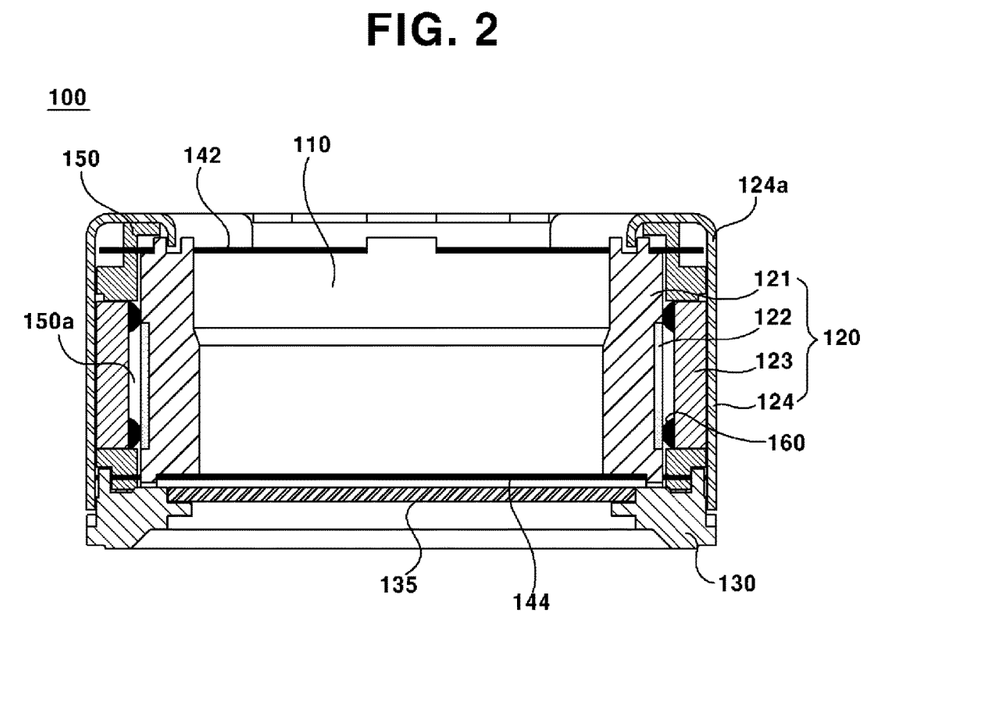
FIG. 2 is a sectional view in the direction of A-A line of FIG. 1.
Figure 3:
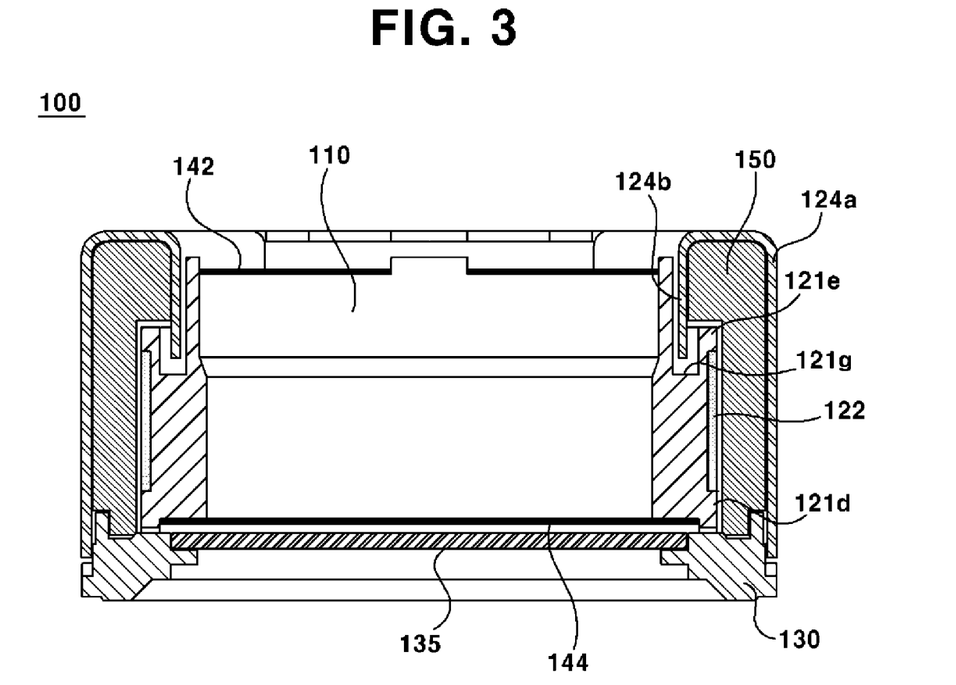
FIG. 3 is a sectional view in the direction of B-B line of FIG. 1.
Figure 4:
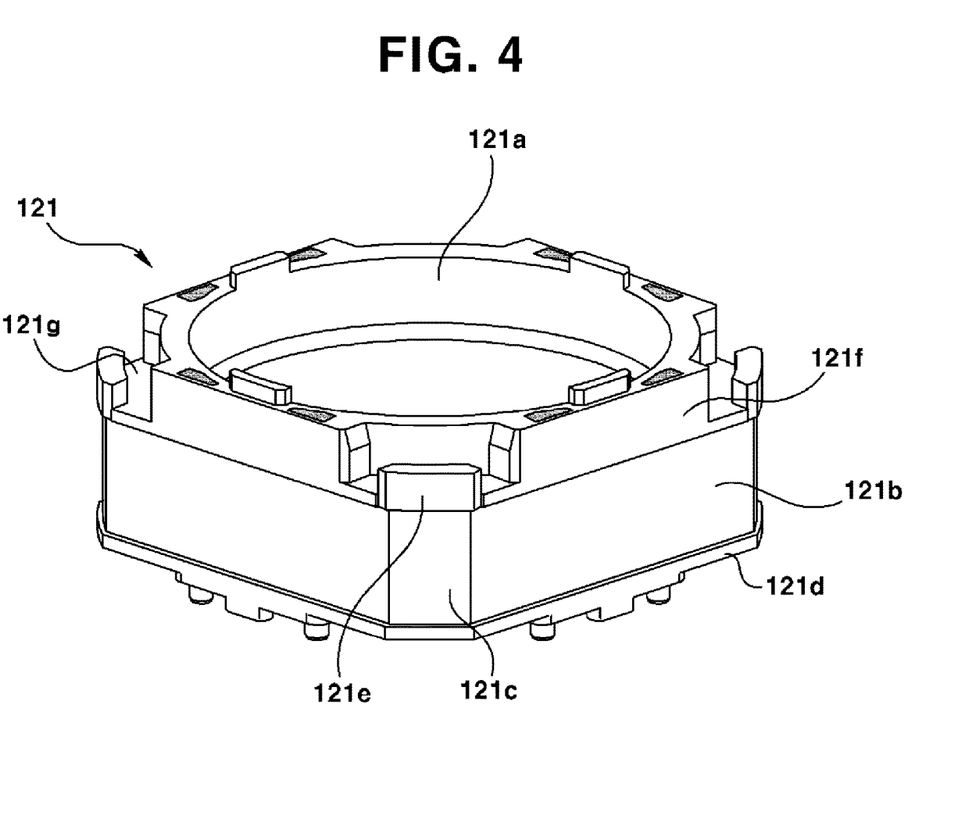
FIG. 4 is a perspective view illustrating a bobbin according to an exemplary embodiment of the present disclosure.
Figure 5:
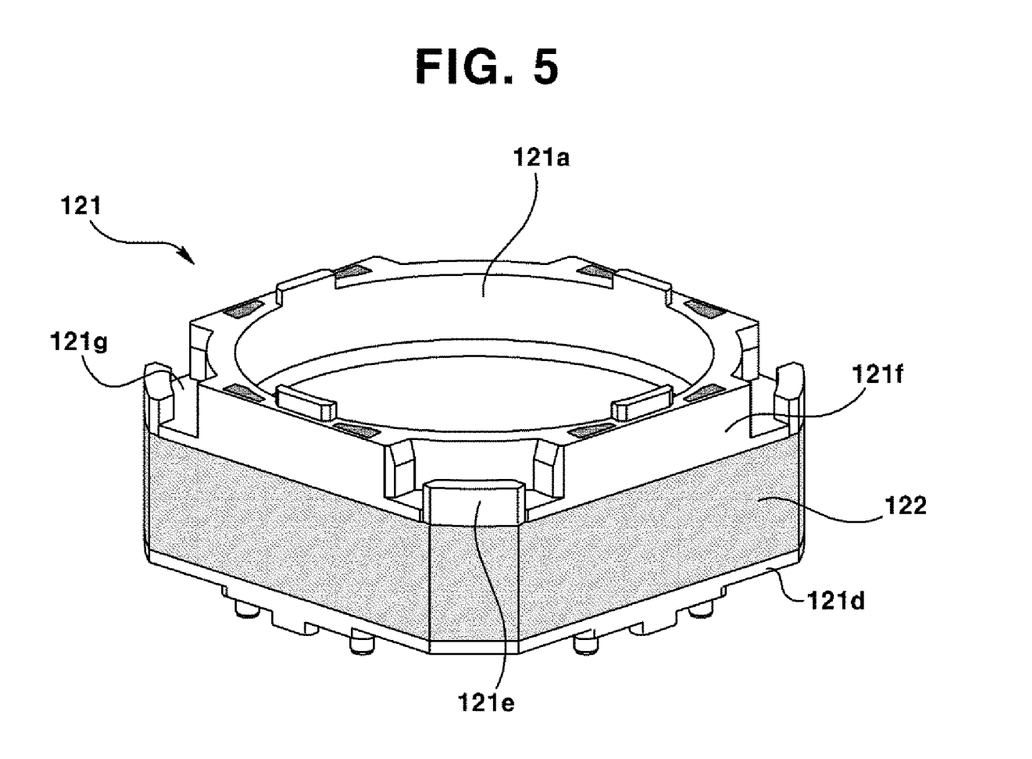
FIG. 5 is a view illustrating a bobbin wound by a coil unit according to an exemplary embodiment of the present disclosure.

FIG. 1 is a perspective view illustrating a lens actuating motor according to an exemplary embodiment of the present disclosure; FIG. 2 is a sectional view in the direction of A-A line of FIG. 1; FIG. 3 is a sectional view in the direction of B-B line of FIG. 1; FIG. 4 is a perspective view illustrating a bobbin according to an exemplary embodiment of the present disclosure; and FIG. 5 is a view illustrating a bobbin wound by a coil unit according to an exemplary embodiment of the present disclosure.

Referring to FIG. 1, the lens actuating motor (100) may widely include a bobbin (121), a coil unit (122), a magnet unit (123), a base (130), an upper elastic member (142), a lower elastic member (144), and a yoke unit (124). Also, the lens actuating motor (100) may further include a housing (150).

In addition, although it is not illustrated in this figure, the lens actuating motor (100) may further include a shield can. Such the shield can protects inner components against outer shocks, and at the same time, has a function to prevent penetration of outer pollutants. Such the shield can should also protect components of the lens actuating motor (100) against outer interference. Thus, the shield can may be formed of a metallic material. In addition, the yoke unit (124) may function as the shield can.

In addition, although it is not illustrated in this figure, the lens actuating motor (100) may further include a printed circuit board at a lower portion of a base (130) which will be described hereinafter. An image sensor may be installed in the middle of upper side of the printed circuit board, on which a variety of components configured to drive the lens actuating motor (100) may be installed. In addition, the printed circuit board may apply an electrical power source to the actuator unit (120) which is will be described hereinafter.

In addition, although it is not illustrated in this figure, the image sensor may be installed in the middle of upper side of the printed circuit board so as to be aligned along the direction of optical axis of the lens held in the lens unit (110). Such the image sensor may convert an optical signal inputted from the lens unit (110) to an electrical signal.

The lens unit (110) is fixed to the bobbin (121). The lens unit (110) may be a lens barrel, but not limited hereto. Thus, any holder structure which is able to support a lens may be included. An exemplary embodiment of a case when the lens unit (110) is a lens barrel is given in the following.

The lens unit (110) may be installed at an upper portion of the printed circuit board, and arranged at a portion corresponding to the image sensor. Such the lens unit (110) may hold at least one lens (not illustrated).

In addition, an infrared cut-off filter (IR filter) may be provided between the image sensor and the lens unit (110). The IR filter (135) may be formed of, for example, a film material or a glass material. Also, the IR filter (135) may be formed by which a kind of infrared cut-off coating material is arranged on a flat optical filter such as a cover glass for image plane protection.

In order to perform as a sensor holder to protect the image sensor as well as to dispose the IR filter (135) and support the actuator unit (120), a base (130) may be provided between the actuator unit (120) and the printed circuit board. In this case, the base (130) may be formed as a component forming the structure of the actuator unit (120) to be united with the actuator unit (120). Separately from the base (130), a sensor holder may hold the image sensor by being disposed at a lower portion of the base (130).

Thus, a camera module may be formed including the lens actuating motor, an image sensor, and a printed circuit board. The camera module may form a digital device by being installed in a device such as a mobile phone.

The lens unit (110) may be installed and fixed inside the bobbin (121). The bobbin (121) may move upward and downward by moving the lens unit (110) fixed to the bobbin (121) to adjust the image focus.

Specifically, the actuator unit (120) may include a bobbin (121) configured to fix the lens unit (110) by being combined with an outer circumferential surface of the lens unit (110), a coil unit (122) provided at an outer circumferential surface of the bobbin (121), a magnet unit (123) disposed facing the coil unit (122), and a yoke unit (124) configured to fix the magnet unit (123).

When an electrical power source is applied from the printed circuit board to the coil unit (122), the lens unit (110) may be moved upward and downward in a direction of the optical axis, by the electromagnetic force formed at the coil unit (122) and by the magnetic force of the magnet unit (123).

An auto focusing (A.F.) actuator in which a voice coil motor is applied may be provided as the actuator unit (120).

The upper and lower elastic members (142, 144) may include a leaf spring. More specifically, the lower elastic member (144) may be combined with a lower surface of the bobbin (121), and the upper elastic member (142) may be combined with an upper surface of the bobbin (121).

The housing (150) may fix the magnet unit (123) and the yoke unit (124), by being fixed on the base (130). In addition, otherwise, the magnet unit (123) may be fixed to the yoke unit (124). The shape of the magnet may be a shape of various pillars such as a triangular prism, a square pillar, or a trapeziform pillar. Each of the pillar shapes may partially include a curved surface. A magnet holding groove (150a) may be formed penetrating through a side wall of the housing (150). The magnet unit (123) may be spaced apart to and facing the coil unit (122), through the magnet holding groove (150a).

Referring to FIGS. 4 and 5, according to an exemplary embodiment of the present disclosure, the bobbin (121) may include a body (121a) configured to hold the lens unit (110), at least two straight line parts (121b) formed on an outer side surface of the body (121a), and a curved part (121c) formed between the straight line parts (121b). Here, the straight line parts (121b) means the bobbin (121)'s outer side surfaces of which cross section in a direction perpendicular to an optical axis are linear.

Four of the straight line parts (121b) may be formed, in a direction perpendicular to an optical axis, longer than the curved part (121c). Therefore, the distortions of the coil unit (122) may be prevented by minimizing the portion where the coil unit (122) is disposed on the curved part (121c). Thus, according to an exemplary embodiment of the present disclosure, the defect rate of the lens actuating motor (100) may be reduced from a perspective of manufacturing productivity through such the distortion prevention. In this case, the magnet may be disposed at a side surface of the yoke unit (124). Here, the side surface of the yoke unit (124) means a surface facing the straight line part (121b) of the bobbin (121).

In addition, in a case when the magnet is disposed at an edge of the yoke unit (124), the curved part (121c) may be formed longer than the straight line part (121b). This is in order to enhance the electromagnetic force interaction between the magnet and the coil.

Meanwhile, in order to facilitate disposition of the coil unit (122), a lower protrusion part (121d) may be formed at a lower portion of the straight line part (121b) and the curved part (121c). The lower protrusion part (121d) may be formed protruding from the straight line part (121b) and the curved part (121c).

A curved protrusion part (121e) configured to guide a bending of the coil unit (122) may be formed at an upper portion of the curved part (121c). In addition, as illustrated in the figure, in order to guide disposition of the coil unit (122) more easily, an upper protrusion unit (121f) may be formed also at the straight line part (121b).

In addition, a groove (121g) may be formed between the curved protrusion part (121e) and the body (121a). Referring back to FIG. 4, the groove (121g) may be formed at an edge of the bobbin (121). In addition, the yoke unit (124) may include a support part (124a) configured to support the magnet unit (123), and a bending part (124b) extending from an upper portion of the support part (124a) by being disposed apart by a predetermined space form a bottom surface of the groove (121g).

In this case, the bending part (124b) may enhance electromagnetic interaction between the magnet unit (123) and the coil unit (122) by functioning as an inner yoke in respect to the coil unit (122). In addition, the curved part (124b) may restrict the upward movement of the bobbin (121) by the space apart from a bottom surface of the groove (121a), and may prevent breakaway of the bobbin (121) from the yoke unit (124) due to shocks.

In addition, because the curved protrusion part (121e) is disposed between the bending part (124b) and the coil unit (122), the contact between the bending part (124b) and the coil unit (122) may be prevented.

Meanwhile, referring to FIG. 2, according to an exemplary embodiment of the present disclosure, the lens actuating motor (100) may further include a damping member (160) coated on a side of the magnet unit (123) facing the bobbin (121). The damping member (160) may be realized as a magneto-rheological fluid. The damping member (160) coated on the magnet unit (123) may cohere to a portion where a magnetism is mostly concentrated in the magnet unit (123), when a magnetic field of the magnet unit (123) is formed. In general, the place where a magnetic field is mostly concentrated in the magnet unit (123) is the edge area of the magnet unit (123). Thus, when the magneto-rheological fluid is concentrated, the height of the damping member (160) is increasing in a direction to the optical axis like a shape of a water drop, as illustrated in the figure, to provide a frictional force by contacting to an outer side surface of the bobbin (121). Such the magneto-rheological fluid is a fluid material in a form of a sol or a gel with a viscosity, and may be provided as either one of a magneto-rheological (MR) fluid, electro-rheological (ER) fluid, an electro-conjugate (EC) fluid, or a magnetic fluid.

That is, the magneto-rheological fluid may function as a damper by interfering with the bobbin (121) when a magnetic field of the magnet unit (123) is formed. More specific description for this will be provided in the following.

Figure 6A:
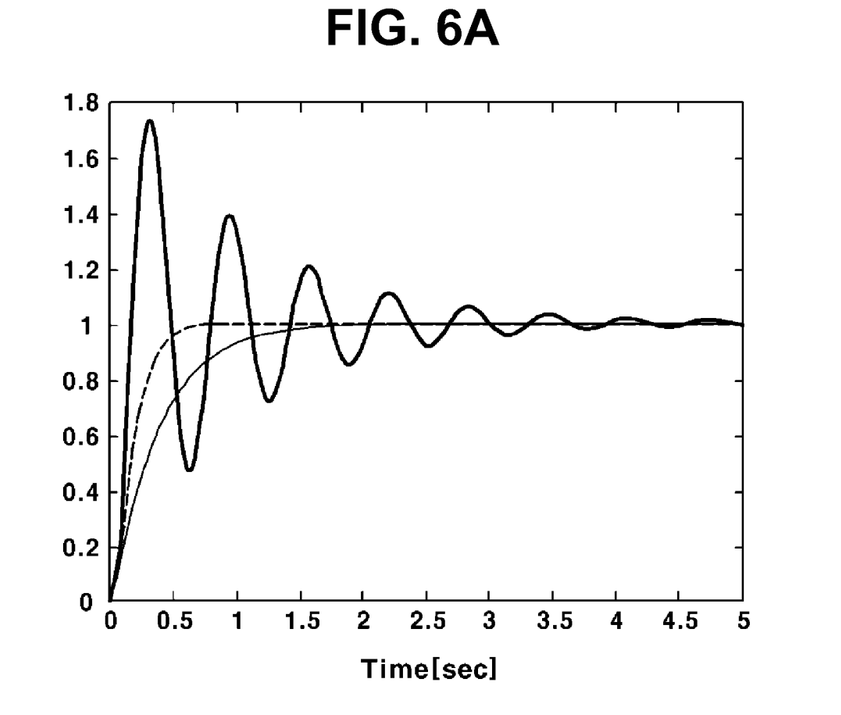
FIG. 6A is a view illustrating a setting time of a conventional lens actuating motor.
Figure 6B:
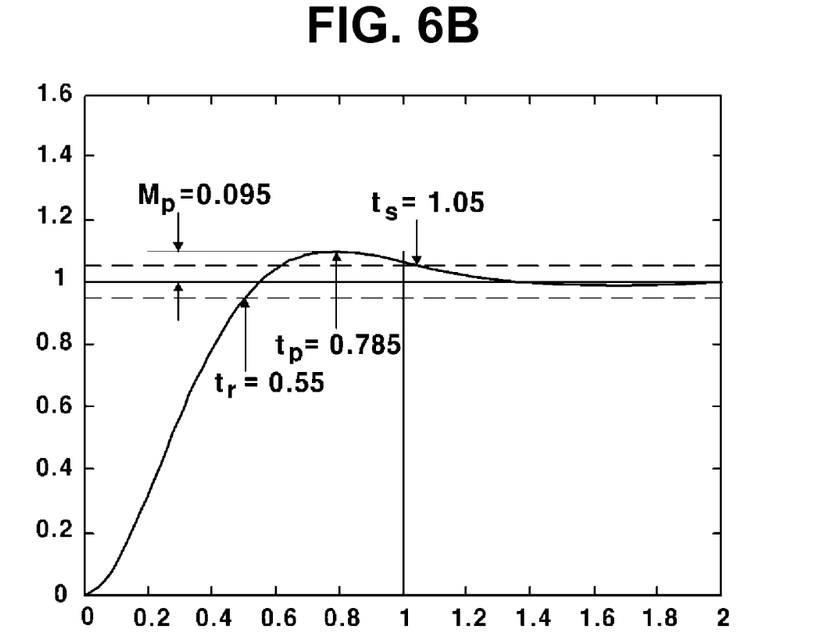
FIG. 6B is a view illustrating a setting time of a lens actuating motor according to an exemplary embodiment of the present disclosure.

FIG. 6A is a view illustrating a setting time of a conventional lens actuating motor; and FIG. 6B is a view illustrating a setting time of a lens actuating motor according to an exemplary embodiment of the present disclosure.

From a perspective of dynamics, the conventional lens actuating motor is a 1-degree of freedom (1-DOF) system which is formed only of a mass called a "bobbin" and an elastic member supporting the mass.

Here, the 1-DOF system may be expressed as an equation: $F=ma+bv+kx$; where 'm' is the mass, 'a' is the acceleration, 'b' is the damping coefficient, 'v' is the velocity, 'k' is the spring constant of the elastic member, and 'x' is the displacement to be transformed.

That is, because the conventional lens actuating motor does not have a system which functions as a damper, $b=0$ in the above equation. By such condition, as illustrated in FIG. 6A, it takes longer setting time which is required to return to the initial stage after movement of the bobbin.

However, according to an exemplary embodiment of the present disclosure, because the lens actuating motor is provided with a magneto-rheological fluid, the value of 'b' may exist in the above equation expressing the 1-DOF system. This enables to realize the shortened setting time, as illustrated in FIG. 6B.

To sum up, according to an exemplary embodiment of the present disclosure, the distortions occurring when disposing the coil unit (122) may be reduced, and the accompanying reliability may be improved, by providing a bobbin (121) and a yoke unit (124) of which structures are advanced. In addition, a lens actuating motor which enables a swift image focus adjustment may be realized by providing a damping member (160).

In addition, according to an exemplary embodiment of the present disclosure, a swift image focus adjustment is available due to shortened setting time by providing the damping member.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims and equivalents thereof.

The technical challenge which the present disclosure intends to achieve is to provide a lens actuation motor which is able to enhance reliability of the lens actuating motor along with a swift focus adjustment function.

In one general aspect of the present disclosure, there is provided a motor for actuating a lens, the motor comprising: a lens unit configured to hold at least one lens; and an actuator unit including a bobbin configured to fix the lens unit, a coil unit configured to wind an outer side surface of the bobbin, a magnet unit disposed to face the coil unit, and a yoke unit configured to fix the magnet unit, wherein the bobbin includes a body configured to hold the lens unit, at least two straight line parts formed on an outer side surface of the body, and a curved part formed between the straight line parts.

In an embodiment of the present disclosure, four of the straight line parts may be formed, in a direction perpendicular to an optical axis, longer than the curved part.

In an embodiment of the present disclosure, a lower protrusion part may be formed at a lower portion of the straight line part and the curved part, a curved protrusion part configured to guide a bending of the coil unit may be formed at an upper portion of the curved part, and a groove may be formed between the curved protrusion part and the body.

In an embodiment of the present disclosure, the yoke unit may include a support part configured to support the magnet unit, and a bending part extending from an upper portion of the support part by being disposed apart by a predetermined space form a bottom surface of the groove.

In an embodiment of the present disclosure, the motor for actuating a lens may further comprise: a printed circuit board configured to apply an electrical power source; and a base configured to support the lens unit and the actuator unit by being installed on the printed circuit board.

In an embodiment of the present disclosure, the motor for actuating a lens may further comprise: a housing configured to fix the magnet unit and the yoke unit by being fixed on the base.

In an embodiment of the present disclosure, the motor for actuating a lens may further comprise: an upper elastic member and a lower elastic member, each configured to elastically support the bobbin, and each disposed at an upper portion and a lower portion of the bobbin, respectively.

In an embodiment of the present disclosure, the motor for actuating a lens may further comprise: a printed circuit board configured to apply an electrical power source; and an image sensor configured to convert an optical signal inputted from the lens unit to an electrical signal by being installed on the printed circuit board.

In an embodiment of the present disclosure, the motor for actuating a lens may further comprise: a damping member coated on a side of the magnet unit facing the bobbin.

In an embodiment of the present disclosure, the damping member is realized as a magneto-rheological fluid, wherein the magneto-rheological fluid is provided as either one of a magneto-rheological (MR) fluid, electro-rheological (ER) fluid, an electro-conjugate (EC) fluid, or a magnetic fluid.

Meanwhile, in another general aspect of the present disclosure, there is provided a motor for actuating a lens, the motor comprising: a lens unit configured to hold at least one lens; an actuator unit including a bobbin configured to fix the lens unit, a coil unit configured to wind an outer side surface of the bobbin, a magnet unit disposed facing the coil unit, and a yoke unit configured to fix the magnet unit, and a damping member coated on a side of the magnet unit facing the bobbin.

In an embodiment of the present disclosure, the damping member is realized as a magneto-rheological fluid, wherein the magneto-rheological fluid is provided as either one of a magneto-rheological (MR) fluid, electro-rheological (ER) fluid, an electro-conjugate (EC) fluid, or a magnetic fluid.

In an embodiment of the present disclosure, the bobbin may include a body configured to hold the lens unit, at least two straight line parts formed on an outer side surface of the body, and a curved part formed between the straight line parts.

In an embodiment of the present disclosure, four of the straight line parts may be formed, in a direction perpendicular to an optical axis, longer than the curved part.

In an embodiment of the present disclosure, a lower protrusion part may be formed at a lower portion of the straight line part and the curved part, a curved protrusion part configured to guide a bending of the coil unit may be formed at an upper portion of the curved part, and a groove may be formed between the curved protrusion part and the body.

In an embodiment of the present disclosure, the yoke unit may include a support part configured to support the magnet unit, and a bending part extending from an upper portion of the support part by being disposed apart by a predetermined space form a bottom surface of the groove.

In an embodiment of the present disclosure, the motor for actuating a lens may further comprise: a printed circuit board configured to apply an electrical power source; and a base configured to support the lens unit and the actuator unit by being installed on the printed circuit board.

In an embodiment of the present disclosure, the motor for actuating a lens may further comprise: a housing configured to fix the magnet unit and the yoke unit by being fixed on the base.

In an embodiment of the present disclosure, the motor for actuating a lens may further comprise: an upper elastic member and a lower elastic member, each configured to elastically support the bobbin, and each disposed at an upper portion and a lower portion of the bobbin, respectively.

In an embodiment of the present disclosure, the motor for actuating a lens may further comprise: a printed circuit board configured to apply an electrical power source; and an image sensor configured to convert an optical signal inputted from the lens unit to an electrical signal by being installed on the printed circuit board.

According to an exemplary embodiment of the present disclosure, winding of the coil unit may be enhanced by improving structure of the bobbin. Also, upward movement of the bobbin may be restricted by the yoke unit.

In addition, according to an exemplary embodiment of the present disclosure, a swift focus adjustment is available due to shortened setting time by providing the damping member.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor for actuating a lens, the motor comprising:
an actuator including a bobbin configured to fix a lens, a coil wound at an outer side surface of the bobbin, a magnet facing the coil, and a yoke configured to fix the magnet, wherein the bobbin includes a body configured to hold the lens, a coil coupling part coupled with the coil, a curved protrusion part protruded from the coil coupling part and formed at a corner of the bobbin, and a groove formed between the curved protrusion part and the body, wherein the yoke includes a bending part downwardly extending from an upper portion of the yoke, and wherein at least a portion of the bending part is provided in the groove.

2. The motor of claim 1, wherein the bobbin further includes at least two straight line parts formed on an outer side surface of the body and a curved part formed between the straight line parts.

3. The motor of claim 2, wherein four of the straight line parts are formed, in a direction perpendicular to an optical axis, longer than the curved part.

4. The motor of claim 2, wherein a lower protrusion part is formed at a lower portion of the straight line part and the curved part, and wherein the lower protrusion part and the curved protrusion part are outerwardly protruded from the outer side surface of the bobbin.

5. The motor of claim 4, wherein the bending part is disposed apart by a predetermined space from a bottom surface of the groove.

6. A camera module, the camera module including:
motor for actuating a lens of claim 1,
a printed circuit board configured to apply an electrical power source to the actuator; and
a base configured to support the lens and the actuator by being installed on the printed circuit board.

7. The motor of claim 1, further comprising:
a housing configured to fix the magnet and the yoke by being fixed on a base.

8. The motor of claim 1, further comprising:
an upper elastic member and a lower elastic member, each configured to elastically support the bobbin, and each disposed at an upper portion and a lower portion of the bobbin, respectively.

9. A camera module, the camera module including:
the motor for actuating a lens of claim 1,
a printed circuit board configured to apply an electrical power source to the actuator; and
an image sensor configured to convert an optical signal inputted from the lens to an electrical signal by being installed on the printed circuit board.

10. The motor of claim 1, further comprising:
a damping member spread on a side of the magnet facing the bobbin.

11. The motor of claim 10, wherein the damping member is realized as a magneto-rheological fluid, wherein the magneto-rheological fluid is provided as either one of magneto-rheological (MR) fluid, electro-rheological (ER) fluid, an electro-conjugate (EC) fluid, or a magnetic fluid.

12. A motor for actuating a lens, the motor comprising:
a yoke;

a bobbin provided at an inner side of the yoke;

a coil provided at an outer side surface of the bobbin; and a magnet provided at the yoke and facing the coil, wherein the bobbin includes a body coupled to at least one lens, a coil coupling part coupled with the coil, an upper protrusion part outerwardly protruded from the coil coupling part and provided at an upper side of the coil coupling part, and a groove provided between the body and the upper protrusion part, and wherein the yoke includes a bending part, at least a portion of the bending part is provided in the groove.

13. The motor of claim 12, wherein the coil coupling part includes two straight line parts formed on an outer side surface of the body, a curved part formed between the straight line parts, wherein the upper protrusion part includes a curved protrusion part disposed at an upper side of the curved part, and wherein the groove is provided between the body and the curved protrusion part.

14. The motor of claim 12, wherein a bottom end of the bending part is arranged apart from a bottom surface of the groove by a predetermined space.

15. A camera module, the camera module including:

the motor for actuating a lens of claim 12, a printed circuit hoard configured to apply an electrical power source to the coil; and a base configured to support the yoke by being installed on the printed circuit board.

16. The motor of claim 12, further including a housing configured to fix the magnet and the yoke by being fixed on a base.

17. The motor of claim 12, further including an upper elastic member and a lower elastic member, each configured to elastically support the bobbin, and each provided at an upper portion and a lower portion of the bobbin, respectively.

18. A camera module, the camera module including:

the motor for actuating a lens of claim 12, a printed circuit board configured to apply an electrical power source to the coil; and an image sensor configured to convert an optical signal inputted from the lens to an electrical signal by being installed on the printed circuit board.

19. The motor of claim 12, further including a magnetorheological fluid provided on a surface of the magnet facing the bobbin.

20. A camera module, the camera module including the motor for actuating a lens of claim 12.

21. A mobile terminal, the mobile terminal including the camera module of claim 20.

* * * * *